United States Patent [19]
Dougherty

[11] Patent Number: 5,702,231
[45] Date of Patent: Dec. 30, 1997

[54] APPARATUS AND METHOD FOR REDUCING NOISE EMISSIONS FROM A GAS TURBINE ENGINE INLET

[75] Inventor: Robert P. Dougherty, Bellevue, Wash.

[73] Assignee: The Boeing Company, Seattle, Wash.

[21] Appl. No.: 694,967

[22] Filed: Aug. 9, 1996

[51] Int. Cl.[6] .................... F01D 25/00; F01N 7/00
[52] U.S. Cl. .................. 415/119; 181/212; 60/226.1
[58] Field of Search ................ 181/212; 415/119; 60/226.1; 137/15.1

[56] References Cited

U.S. PATENT DOCUMENTS

| | | | |
|---|---|---|---|
| 3,890,060 | 6/1975 | Lipstein | 415/119 |
| 3,946,830 | 3/1976 | Kutnet et al. | 181/33 |
| 4,534,167 | 8/1985 | Chee | 60/226.1 |
| 4,786,231 | 11/1988 | Kelley | 415/119 |
| 4,828,175 | 5/1989 | Heufler et al. | 239/14.2 |
| 5,058,617 | 10/1991 | Stockman et al. | 137/15.1 |

*Primary Examiner*—Denise L. Ferensic
*Assistant Examiner*—Joanne Kim
*Attorney, Agent, or Firm*—Robert H. Sproule

[57] ABSTRACT

Noise attenuating linings for a turbofan engine inlet are installed around the upper crown area and/or around the lower lip. The acoustical lining at the upper crown area attenuates those fan noise emissions which are normally reflected from the crown area downward toward the ground. The acoustical lining at the lower inlet lip attenuates those fan noise emissions which travel along the inner surface of the lip and are diffracted around the lower lip downward toward the ground.

7 Claims, 5 Drawing Sheets

APPARATUS AND METHOD FOR REDUCING NOISE EMISSIONS FROM A GAS TURBINE ENGINE INLET

TECHNICAL FIELD

The present invention pertains to a nacelle inlet for a gas turbine engine, and more particularly to apparatus and methods for reducing fan noise emissions from the inlet of an aircraft turbofan engine.

BACKGROUND OF THE INVENTION

In response to public criticism, a number of national and international agencies as well as airplane manufacturers and engine manufacturers are in the process of establishing more stringent noise emission standards for new type aircraft. Some airports, such as London Heathrow, Washington National and John Wayne, limit aircraft traffic based on noise emissions to the surrounding communities.

Certification requirements and current airport noise rules limit the amount of noise which can be emitted during takeoff and during approach to landing. Noise generated by a jet transport aircraft is classified as airframe noise and engine noise, which in turn can be divided into fan noise, combustor noise, turbine noise, low pressure compressor noise and jet noise. Engine noise produced during takeoff is usually the highest contributor because the engine is at its highest power setting. Jet noise is caused by the shearing of three different air flows—the airflow from the engine fan duct exhaust with the ambient airflow and the airflow from the engine core exhaust with the engine fan duct exhaust.

Historically, suppression of jet noise has been achieved most dramatically by increasing secondary-to-primary mass flow bypass ratios. Other attempts to reduce jet noise have been directed to various types of "hush kits" such as free mixers (i.e. ejectors) and forced mixers. The hush kit is typically connected to the aft end of the engine and uses multiple lobes or spokes to mix the high velocity hot streams from the engine with the cooler lower velocity free streams of the surrounding air.

On the other hand, fan noise radiates from the inlet of the engine as well as from the fan nozzle. It results from the rotating fan blades impacting the air entering the inlet and fan blade wakes impacting the fan exit guide vanes. It is believed a significant portion of fan noise is generated from the tips of the fan blades. For large aircraft, such as the Boeing 747, with high bypass ratio engines, one of the most significant noise sources affecting the population on the ground below the airplane is fan noise radiated from the inlet.

Typically, inlet-radiated fan noise is attenuated by installing acoustic linings on portions of the inner surface of the engine inlet. Conventional low frequency wave analysis methods have used acoustic lining area as the principal design factor. It has been thought that once the inlet lining area reached a threshold amount, adding more lining material did not significantly reduce fan noise. Therefore, manufacturers have not attempted to acoustically line the entire inlet. Furthermore, most conventional noise reduction methods have not analyzed in detail noise propagation inside the inlet.

Noise attenuating linings, which have been installed in conventional locations inside the inlet duct, have been only partially effective in reducing fan noise. This is because the hard wall regions of the inlet, which are located between the acoustically lined areas of the inlet, reflect fan generated sound waves downward from the nacelle to the ground below.

There are a number of conventional acoustical linings for reducing engine noise. For example, U.S. Pat. No. 3,890,060 by Lipstein, describes acoustical treatment for a nacelle inlet wherein acoustical material is applied asymmetrically within the nacelle duct for optimum noise suppression. Other disclosures of conventional acoustical linings include U.S. Pat. No. 4,786,231 by Kelley which describes a fan inlet having sound absorbing material which is shaped in a frustoconical configuration; and U.S. Pat. No. 4,534,167 by Chee (assigned to the assignee of the present invention) which describes an inlet cowl having an inner acoustic skin that is perforated to minimize noise produced at the engine intake.

Another conventional approach to reducing community noise due to fan noise emissions has been to provide a lip which protrudes forward from the bottom edge of the nacelle inlet. This lip, which is sometimes referred to as a "scarf", acts as a shield which reflects downwardly directed noise waves in an upward direction so that these waves do not reach the ground population below. This approach has been described in U.S. Pat. No. 3,946,830 by Kumey et al and U.S. Pat. No. 5,058,617 by Stockman et al.

SUMMARY OF THE INVENTION

The present invention pertains to an inlet for a turbofan engine. The inlet includes an upper inlet portion having a leading edge, and a lower inlet portion having a leading edge wherein the leading edge of the lower inlet portion extends forward of the leading edge of the upper inlet portion. In addition, noise attenuating material is located along the leading edge of the lower inlet portion. This material extends rearward from the leading edge of the lower inlet portion along an inner surface of the inlet to a throat portion of the inlet. In addition, the noise attenuating material extends rearward from the leading edge of the lower inlet portion along an outer surface of the inlet to a location which is below the throat portion of the inlet.

In another exemplary embodiment, the inlet also includes noise attenuating material located at an upper leading edge of the inlet. This material extends rearward from the upper leading edge along an upper inner surface of the inlet to a throat portion of the inlet.

It is an object of the present invention to provide an inlet which has reduced fan noise emissions.

It is another object to provide an inlet which reduces fan noise resulting from creeping waves diffracted about a lower portion of the inlet.

It is another object to provide an inlet which reduces fan noise resulting from waves reflected from an upper crown portion of the inlet.

BRIEF DESCRIPTION OF THE DRAWINGS

These and other objects and advantages of the present invention will be discussed in greater detail in the following Detailed Description in conjunction with the attached drawings, in which.

DETAILED DESCRIPTION

Before providing a detailed description of the present invention, a further discussion of conventional methods for reducing fan noise emissions will be provided.

Figure 1:
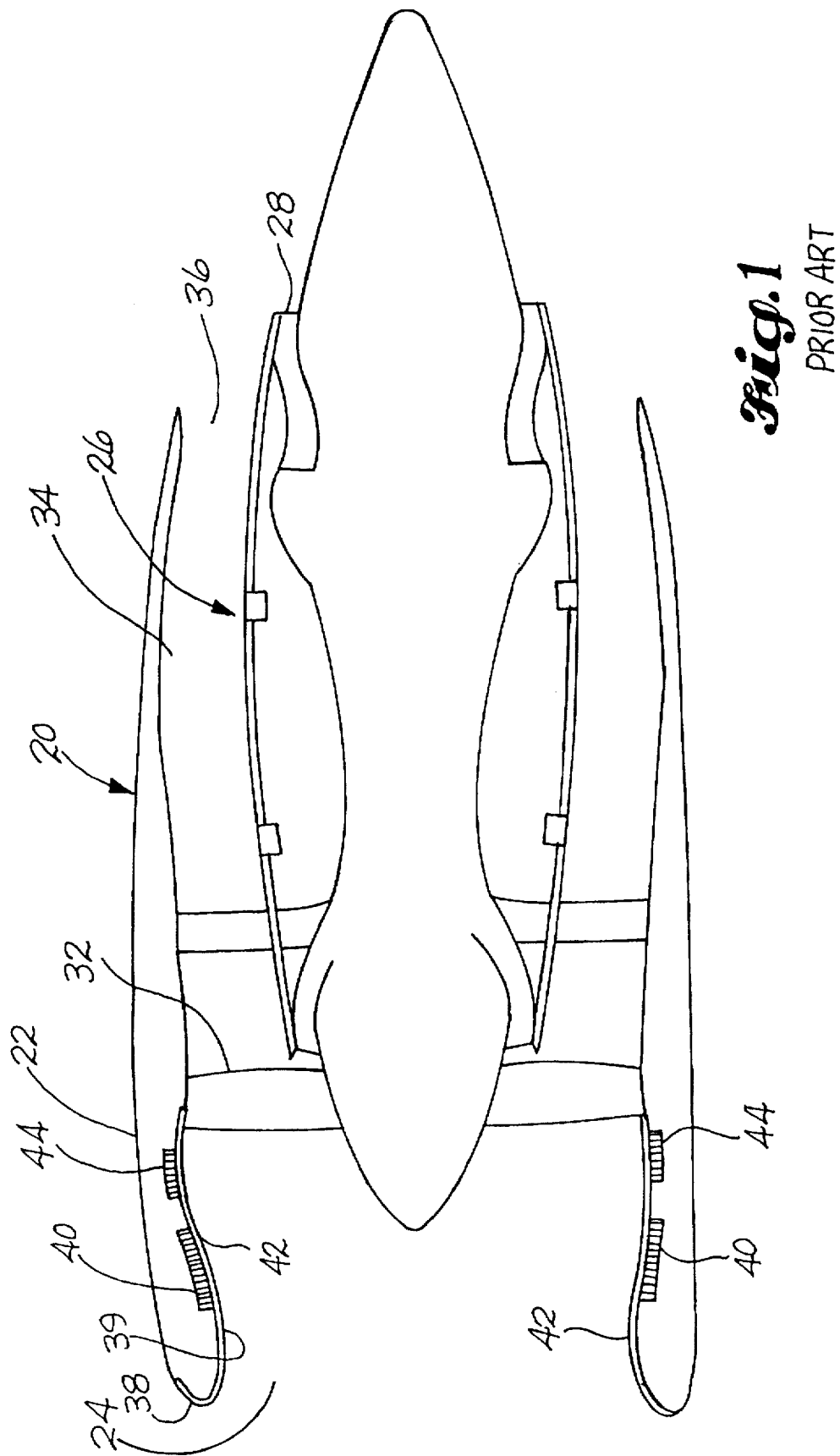
FIG. 1 is side sectional view of a conventional turbofan engine having conventionally located acoustical linings in the inlet.

A description of conventionally located acoustical linings is provided in reference to FIG. 1 which shows a conventional aircraft jet engine indicated at 20. The engine includes a nacelle 22 having an inlet 24, a core section indicated at 26, and an exhaust 28. Located downstream from the inlet 24 is a fan 32 which sends bypass air through a fan duct 34 and out a fan duct outlet 36. As shown in FIG. 1, as the inner surface of the inlet proceeds rearward from a leading edge 38, it converges until reaching a throat portion 39 whereat the inlet diverges until reaching a location slightly upstream of the fan 32.

The inlet 24 includes a forward acoustical lining 40 which is conventionally located just behind the throat 39 of the inlet. The throat 39 is defined as the location where the inlet inner surface stops converging and begins to diverge. The lining 40 extends circumferenfially about an inner wall 42 of the inlet. In addition, the inlet 24 includes a rearward acoustical lining 44 which is conventionally located slightly upstream of the fan 32 and which also extends circumferentially about the inner wall 42.

Figure 2:
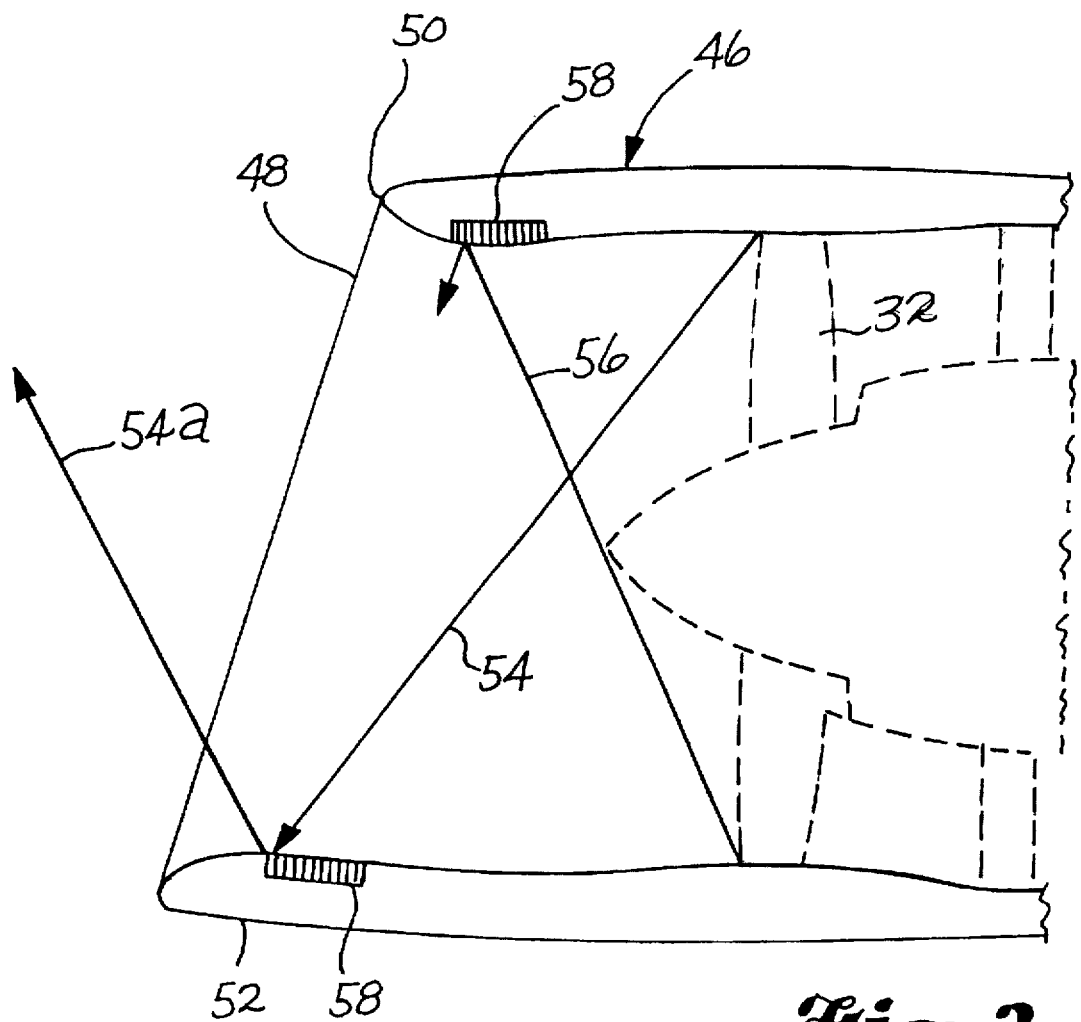
FIG. 2 is a side sectional view of an inlet of a conventional turbofan engine showing fan noise propagation.

Referring now to FIG. 2 there is shown another conventional nacelle indicated at 46 including an inlet 48 having an upper forward leading edge 50 and a lower lip 52 which extends forward of the upper leading edge 50. The lip 52, which is also known as a "scarf", causes certain fan noise emissions which are generated in a downward direction, such as those represented by an arrow 54 in FIG. 2, to either be attenuated by acoustical material and/or to be reflected upward as shown by the arrow 54a and away from the ground (population) below. Other fan noise emissions, such as those generated in an upward direction and which are represented by an arrow 56 in FIG. 2, are attenuated by the forward acoustic lining 58. In addition, there are spiraling type noise waves (not shown) which are generated by the fan and which are reflected from the surfaces of the inlet, but not always from the top or bottom of the inlet.

Figure 3:
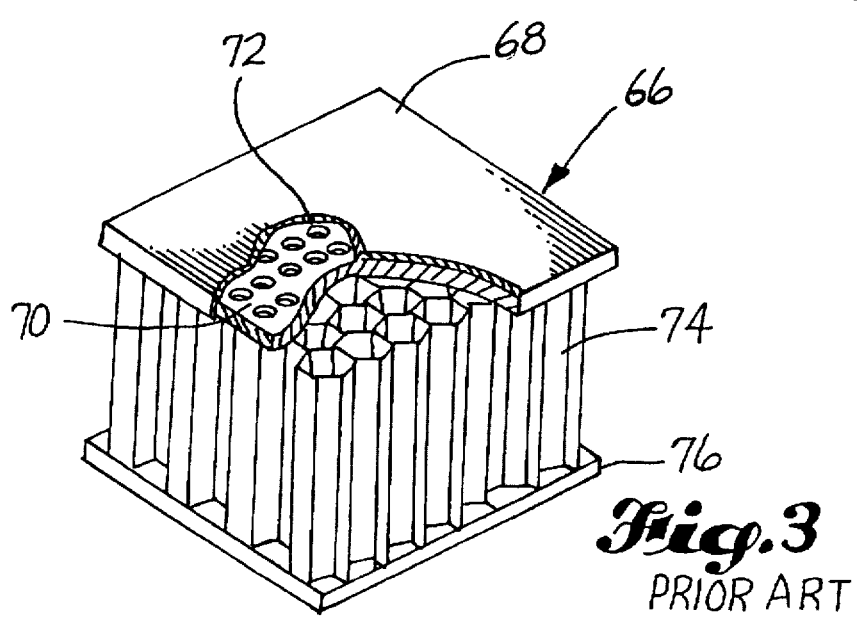
FIG. 3 is a partially cutaway perspective view of a conventional noise attenuating acoustical lining.

There are many different types of acoustical linings. For example, as shown in FIG. 3, an exemplary conventional acoustical lining indicated at 66 includes a woven wire 68 which overlays a sheet 70. The sheet 70 includes perforations 72 therethrough which are in communication with a honeycomb core 74. The honeycomb core 74 is backed by an impervious sheet 76.

Having completed a discussion of conventionally located acoustical linings and fan noise propagation, attention will be turned to the details of the present invention. It has been found that fan noise includes many different frequencies (essentially broad band in nature); however, many of these fan noise emissions are in the high frequency spectrum. Due to their high frequency nature, these waves tend to propagate in straight line paths. When they impact those portions of the inlet surface which do not have acoustical lining, they are reflected without much attenuation from these surfaces. The direction of reflection can be predicted based on the fact that the wave's angle of reflection from the reflected surface is equal to its angle of incidence at that surface.

Figure 4:
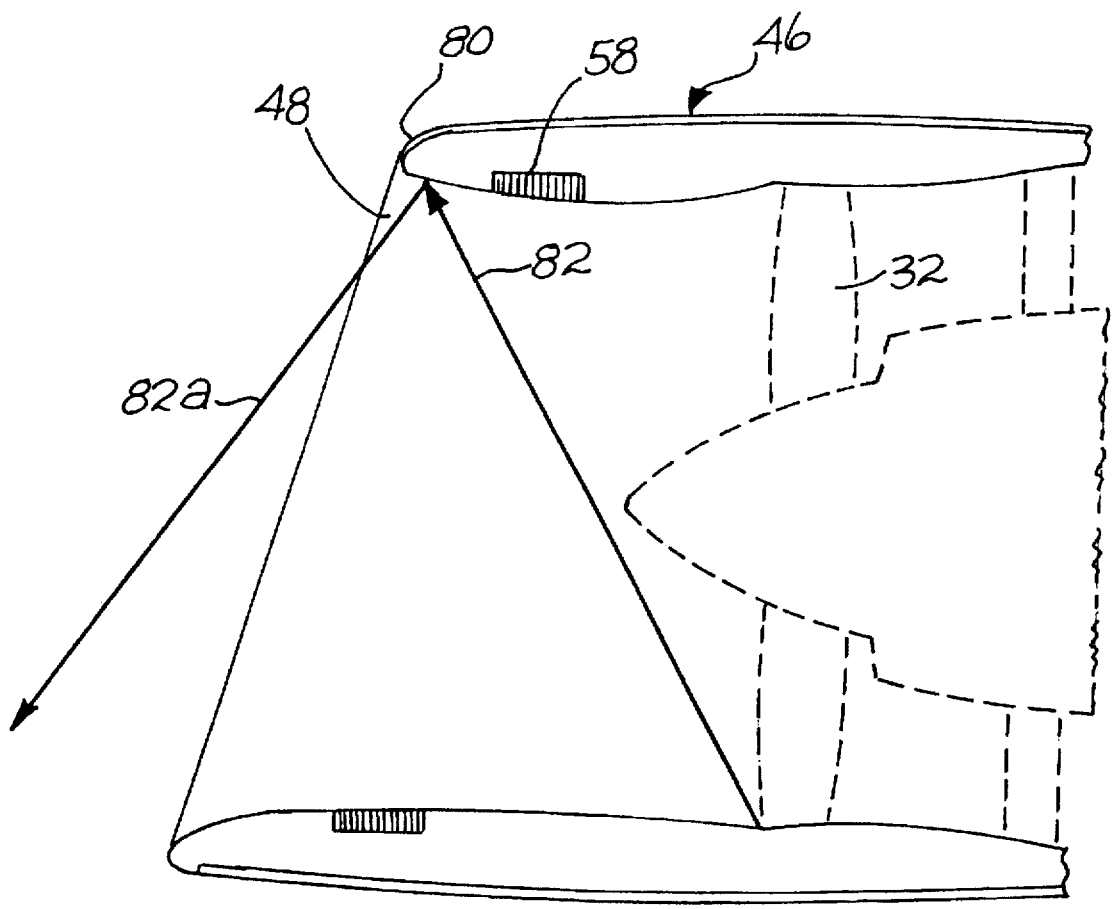
FIG. 4 is a side sectional view of an inlet of a conventional turbofan engine showing fan noise propagation.

It has been found that some of these fan noise waves impact a forward upper edge portion (crown) 80 as shown in FIG. 4. A fan noise wave represented by the arrow 82, which is directed toward the crown 80, is reflected toward the ground as shown by the arrow 82a. The conventional location of the lining 58 shown in FIG. 4 does not intercept this particular noise wave propagation.

Figure 5:
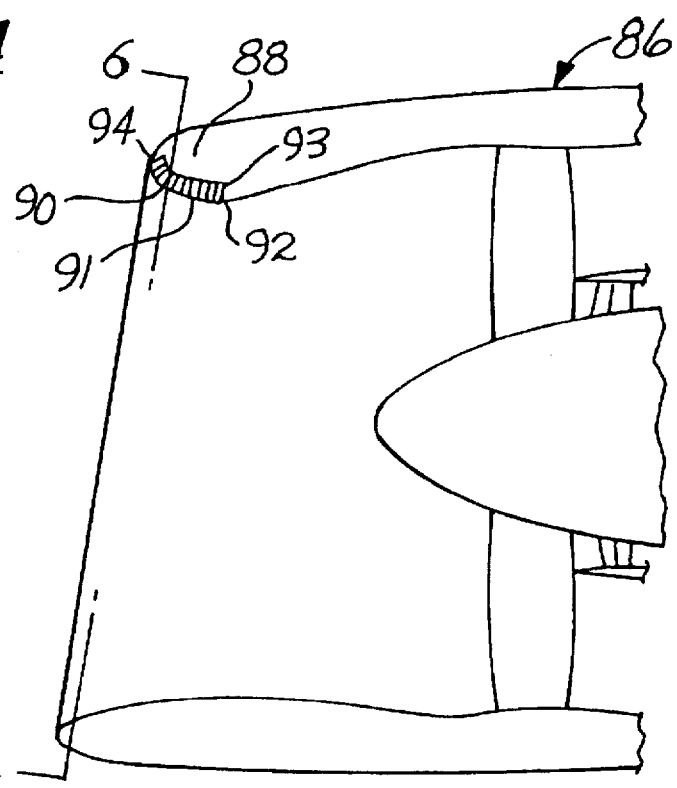
FIG. 5 is a side sectional view of a first exemplary embodiment of an inlet of the present invention.
Figure 6:
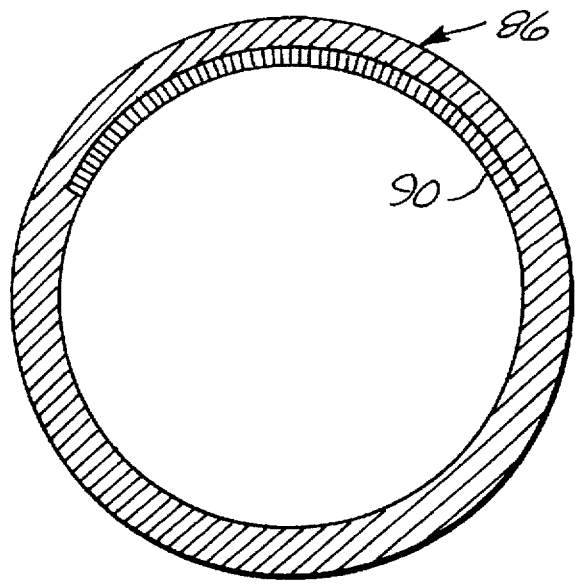
FIG. 6 is a front sectional view of the inlet taken along line 6—6 of FIG. 5.

In the present invention, in order to attenuate the noise emissions which impact the crown area 80, an acoustical attenuating lining is applied to this area as shown in FIGS. 5 and 6. There is shown in FIG. 5 an exemplary nacelle indicated at 86 which includes a crown area 88 at the leading edge of the upper portion of the inlet where it terminates at a rear end surface 93. In order to attenuate those fan noise emissions which impact this area, a noise absorbing acoustical lining 90 is installed there. The lining 90 extends rearward from the leading edge along an inner surface 91 of the crown at least as far rearward as a throat portion 92 of the inlet. In addition, the lining 90 extends in a clockwise direction (when viewing FIG. 5) upward around the leading edge of the crown a sufficient distance to ensure that any fan noise emissions which impact the surface of the crown 88 will be attenuated by the acoustic lining. In order to accomplish this, the lining 90 terminates at a forward end surface 94, which preferably, is located about midway between the uppermost point on the upper surface and lowermost point on the lower surface of the crown, or in other words, forward end surface 94 is at about the nine o'clock position (when viewing the engine from the port side as shown in FIG. 5) on the leading edge of the crown.

To ensure optimum attenuation of those fan noise emissions which are impact the crown 88, as shown in FIG. 6, the lining 90 extends around the upper circumference of the inlet between about the ten o'clock position and about the two o'clock position (when viewing the engine from the front as shown in FIG. 6), or about one third the circumference of the inlet. This assures optimum attenuation of the fan noise emissions which would reach an observer under the flight path of the airplane.

However, in a further exemplary embodiment (not shown), the lining 90 extends about the upper circumference of the inlet 86 between about the nine o'clock position and the three o'clock position so as to absorb those fan noise emissions which propagate to the sides of the engine as well.

The lining 90 is a conventional acoustical absorbing lining used in aircraft turbofan engine inlets. In an exemplary embodiment, the lining 90 is the acoustical absorbing material 66 described with reference to FIG. 3 having a thickness of at least one fourth of the wavelength of the high frequency fan noise emissions, or a thickness of at least one inch. It has been found that a lining 90 having an impedance value of about 1.7 ρ·c is satisfactory, where ρ is the density of air (in pounds per cubic foot) at sea level and c is equal to the speed of sound.

Figure 7:
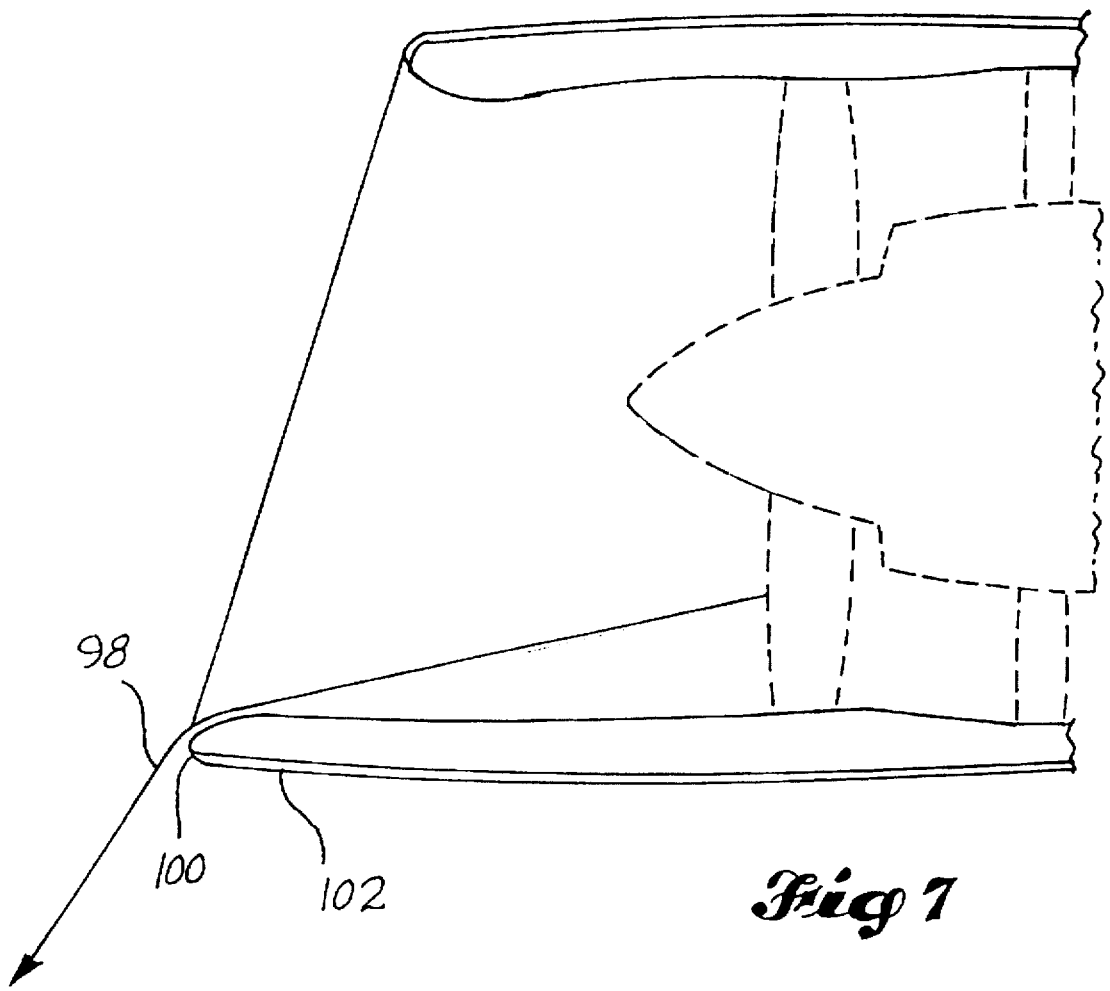
FIG. 7 is a side sectional view of an inlet of a conventional turbofan engine showing fan noise propagation due to creeping waves.

Referring now to FIG. 7, it has been found that there is another source of fan noise emissions, represented by an arrow 98, which are propagated to the ground. These fan noise emissions are the result of fan noise waves which diffract about a leading edge 100 of a lower lip 102 of the nacelle and are referred to as "creeping waves". Creeping waves result from fan noise emissions which impact the inlet surface tangentially, or near tangentially, and instead of being reflected from the surface of the inlet, propagate along the surface of the inlet. In the present invention, attenuation of these creeping waves is accomplished as shown in FIGS. 8 and 9 by an acoustic lining 106 of a nacelle indicated at 108.

Figure 8:
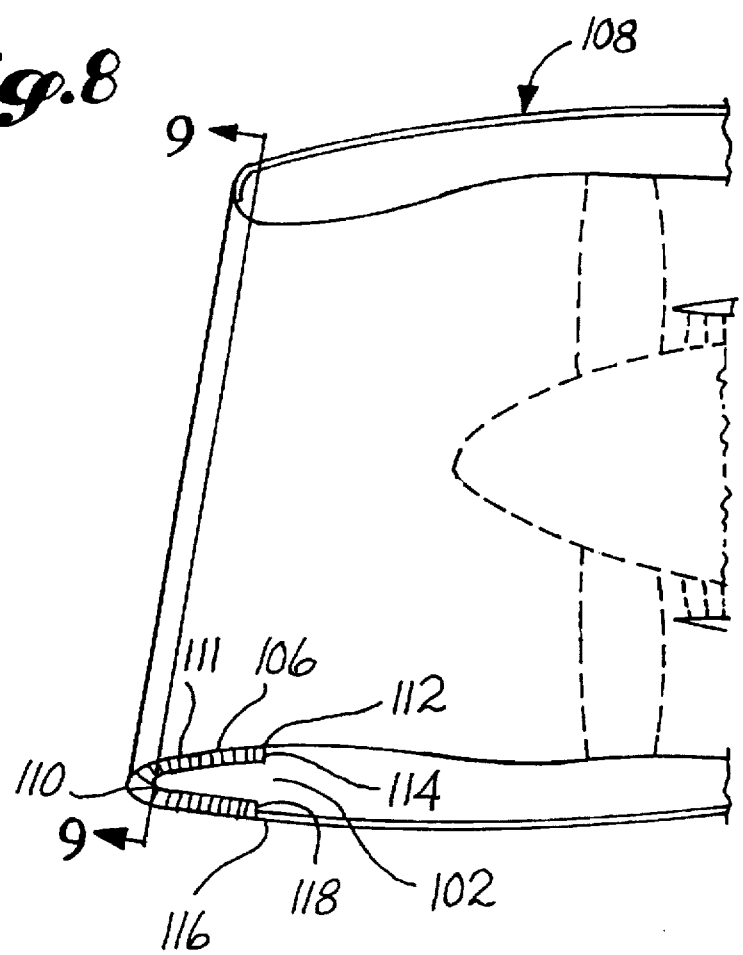
FIG. 8 is a side sectional view of a second exemplary embodiment of the inlet of the present invention.

As shown in FIG. 8 (viewing the port side of the engine), beginning at a leading edge 110 of the nacelle inlet, the lining 106 extends upward and rearward along the upper inner surface 111 of the inlet's lower lip 102 to the throat 112 where it terminates at a rear end surface 114. It is believed that fan generated noise waves which are present rearward of the throat 112 are reflected from the surface of the inlet at sufficiently large angles to be reflected inside the inlet instead of propagating along the surface of the inlet as creeping waves.

In addition, the lining 106 extends around the lower portion of the leading edge 110 of the lower lip 102 in a counterclockwise direction (when viewing FIG. 8) and then rearward along an outer surface 116 of the lower lip where it terminates at a rear end surface 118 which is directly below its upper rear end surface 114.

Figure 9:
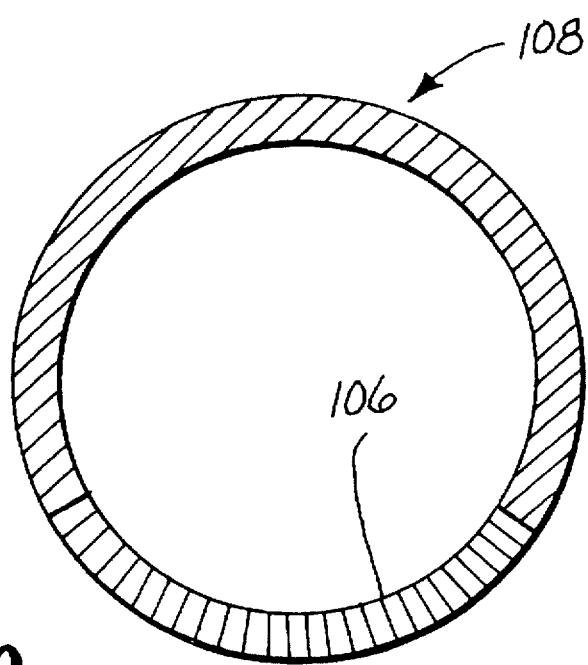
FIG. 9 is a front sectional view of the inlet taken along line 9—9 of FIG. 8.

To ensure optimum attenuation of those fan noise emissions which propagate to the ground directly beneath the flight path of the airplane, the lining 106 extends around the lower circumference of the inlet 108, as shown in FIG. 9 (viewing the front of the engine), between about the four o'clock position and the eight o'clock position, or about one third the circumference of the inlet.

In a further exemplary embodiment (not shown), the lining 106 extends about the lower circumference of the inlet between about the nine o'clock position and the three o'clock position so as to absorb those fan noise emissions which propagate to the side of the engine as well.

The lining 106 is a conventional acoustical absorbing lining used in aircraft turbofan engine inlets. It has been found that conventional noise attenuating lining is acceptable for attenuating creeping waves as well as reflected waves. In an exemplary embodiment, the lining 106 is the acoustical absorbing material 66 described with reference to FIG. 3 having a thickness of at least one fourth of the wavelength of the high frequency fan noise emissions, or a thickness of at least one inch. It has been found that a lining 106 having a low reflection coefficient at the dominant angles of incidence is preferable. Furthermore a lining 106 having an impedance value of about 1.4 ρ·c is satisfactory.

In an exemplary embodiment, in order to achieve optimum reduction of fan noise emissions, the lip lining 106 (FIGS. 8 and 9) is used in combination with (i) the crown lining 90 (FIGS. 5 and 6), and (ii) the conventionally located linings 40, 44 (FIG. 1). The scarf lower lip lining 58 (FIG. 2) is not needed because the noise ray 54, which is reflected from the scarf area 52, does not reach the ground.

What is claimed is:

1. An inlet for a turbofan engine comprising:

a. an upper inlet portion having a leading edge;

b. a lower inlet portion having a leading edge wherein the leading edge of the lower inlet portion extends forward of the leading edge of the upper inlet portion;

c. a throat portion; and d. noise attenuating material located at the leading edge of the lower inlet portion in a manner that the noise attenuating material extends rearward from the leading edge of the lower inlet portion along an inner surface of the lower inlet portion to the throat portion, and in a manner that the noise attenuating material extends rearward from the leading edge of the lower inlet portion along an outer surface of the lower inlet portion to a location which is below the throat portion of the inlet.

2. The inlet as set forth in claim 1 wherein the noise attenuating material at the lower inlet portion extends about a circumference of the lower inlet portion, when viewing a front of the inlet, in a clockwise direction between about a four o'clock position and about an eight o'clock position on the inlet.

3. The inlet as set forth in claim 1 additionally comprising noise attenuating material located at the upper inlet portion in a manner that the noise attenuating material extends around the leading edge of the upper inlet portion in a counterclockwise direction, when viewing the inlet from a port side of the inlet, and then in a direction rearward along an upper inner surface of the upper inlet portion to the throat portion.

4. The inlet as set forth in claim 3 wherein the noise attenuting material begins at about a nine o'clock position on the leading edge of the upper inlet portion.

5. A method for reducing noise emissions from an inlet of a turbofan engine, the method comprising the steps of:

a. installing noise attenuating material at a lower portion of the inlet having a lower leading edge;

b. installing the noise attenuating material in a manner that it extends from the lower leading edge in a direction rearward along an inner surface of the lower inlet portion to a throat portion of the inlet; and c. installing the noise attenuating material in a manner that it extends from the lower leading edge in a direction rearward along an outer surface of the lower inlet portion to a location which is below the throat portion of the inlet.

6. The method as set forth in claim 5 additionally comprising the step of installing the noise attenuating material at the lower leading edge in a manner that the material extends about a circumference of the lower portion of the inlet, when viewing a front of the inlet, in a clockwise direction between about a four o'clock position and about an eight o'clock position on the inlet.

7. The method as set forth in claim 5 additionally comprising the step of installing the noise attenuating material at an upper portion of the inlet having an upper leading edge in a manner that the noise attenuating material begins at about a nine o'clock position on the upper leading edge, when viewing the inlet from a port side of the inlet, in a counterclockwise direction around the upper leading edge and then rearward along an upper inner surface of the inlet upper portion to a throat portion of the inlet.

* * * * *